United States Patent [19]
Diamond

[11] Patent Number: 5,957,746
[45] Date of Patent: Sep. 28, 1999

[54] DEVICE FOR HOLDING AND ROTATING CANDY

[75] Inventor: Sidney Diamond, Barrington Hills, Ill.

[73] Assignee: Imaginings 3, Inc., Niles, Ill.

[21] Appl. No.: 08/923,140

[22] Filed: Sep. 4, 1997

[51] Int. Cl.[6] .................................................. A63H 1/06
[52] U.S. Cl. .......................................... 446/266; 446/236
[58] Field of Search ..................... 446/266, 236

[56] References Cited

U.S. PATENT DOCUMENTS

| | | |
|---|---|---|
| 625,179 | 6/1899 | Lyons .......................................... 15/26 |
| 710,465 | 10/1902 | Kaiser ....................................... 74/133 |
| 2,135,606 | 11/1938 | Stuve . |
| 2,627,698 | 2/1953 | Wood . |
| 2,731,767 | 1/1956 | Holt . |
| 2,766,123 | 10/1956 | Moubayed . |
| 2,799,587 | 7/1957 | Schwartz . |
| 2,874,496 | 2/1959 | Rakes . |
| 3,054,217 | 9/1962 | D'Amato . |
| 3,064,389 | 11/1962 | Lemelson . |
| 3,290,157 | 12/1966 | Schwartz et al. . |
| 3,615,596 | 10/1971 | Petti et al. . |
| 3,797,163 | 3/1974 | McRoskey et al. . |
| 5,045,014 | 9/1991 | Harkins . |
| 5,209,692 | 5/1993 | Coleman et al. ......................... 446/71 |

FOREIGN PATENT DOCUMENTS

| | | |
|---|---|---|
| 0 036 227 | 9/1981 | European Pat. Off. . |
| 2323121 | 5/1973 | Germany . |
| 610746 | 5/1979 | Switzerland . |
| 832046 | 4/1960 | United Kingdom . |

Primary Examiner—Jessica J. Harrison
Assistant Examiner—David A. Fleming
Attorney, Agent, or Firm—Dick and Harris

[57] ABSTRACT

A manually operable device for holding and rotating candy, such as a sucker, that requires only one hand to hold and operate. The device has a handle portion that may be held with one hand of the user. A trigger is carried by the handle for manipulation against the bias of a spring or the like using the same hand of the user as is holding the handle. Actuation of the trigger moves a rack which in turn both rotates and linearly moves a set of gears to rotate a shaft that extends out of the handle. Attached to the end of the shaft extending out of the handle is a sucker or lollipop that is rotated as a result of actuation of the trigger. The sucker may be carried on a dish which is attached to the shaft, outside of the handle portion, for rotation with the shaft.

14 Claims, 3 Drawing Sheets

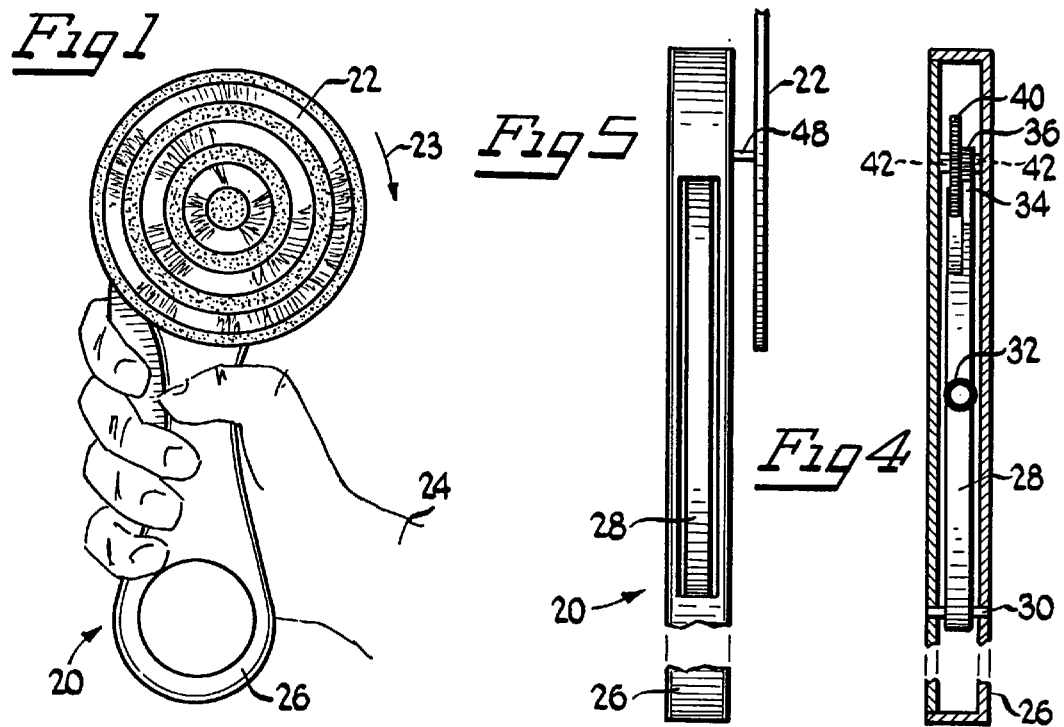
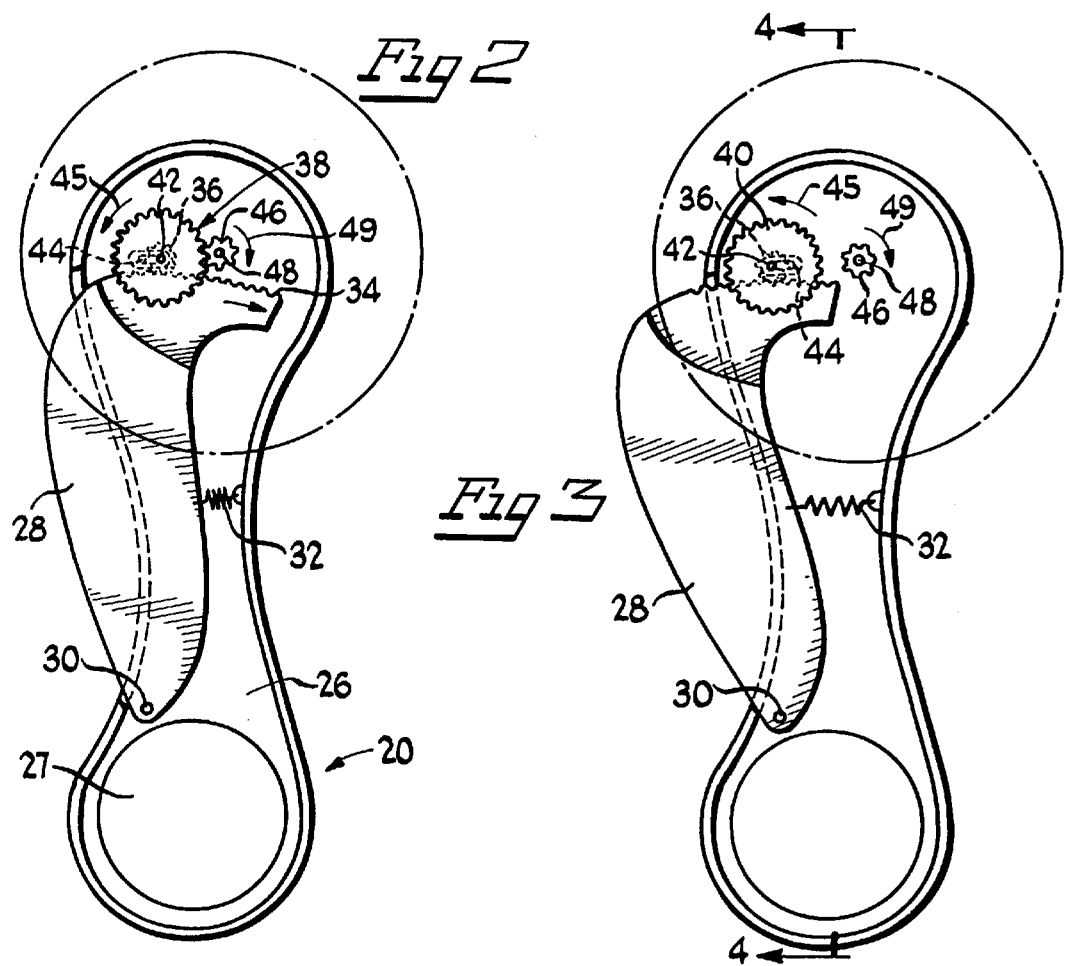

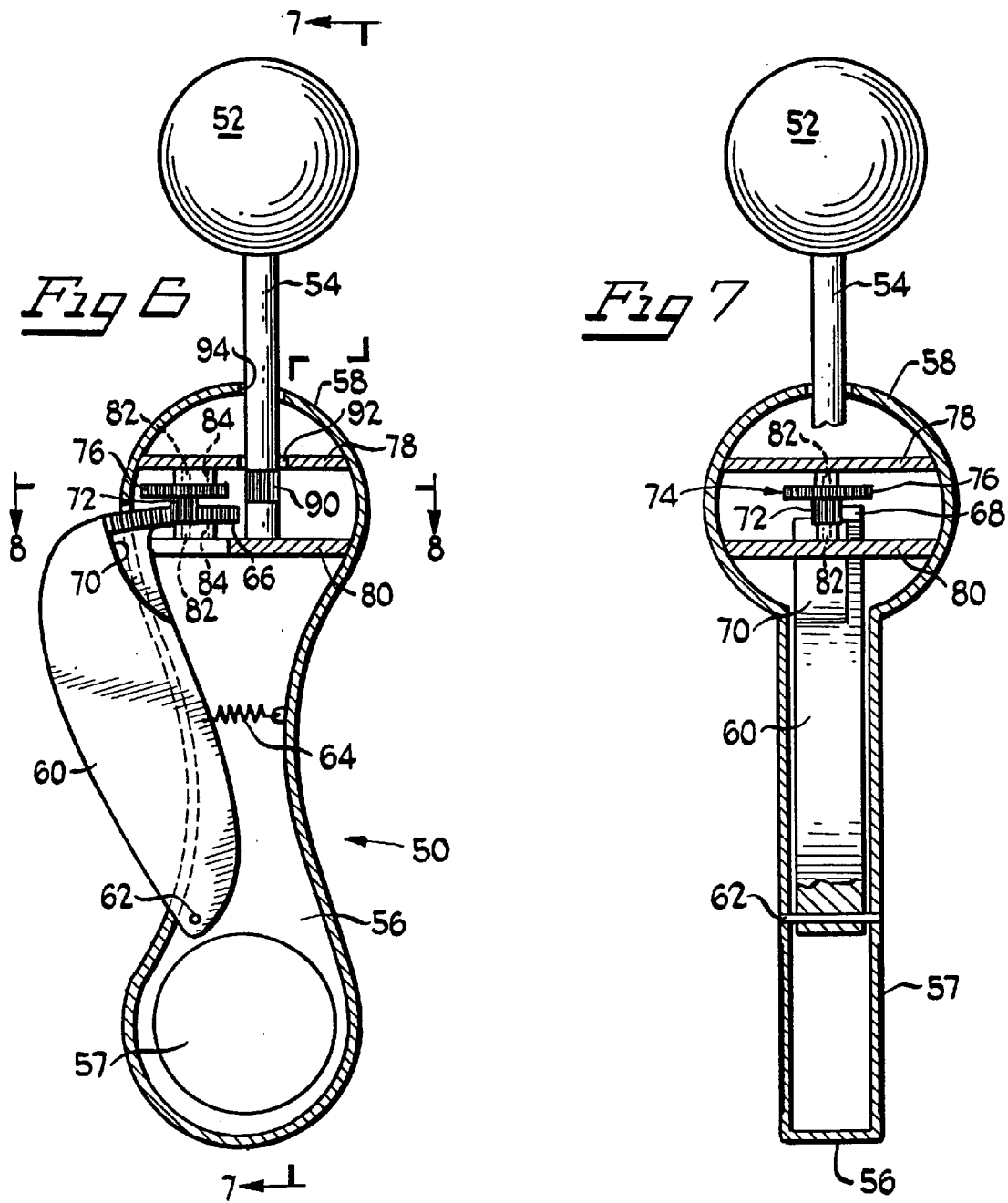
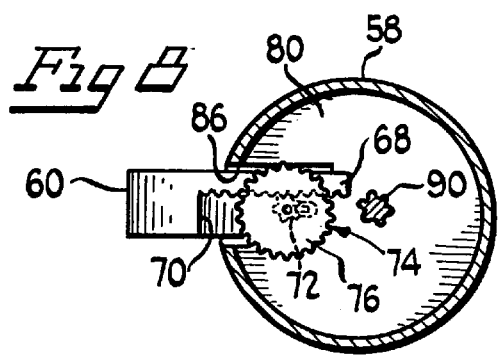

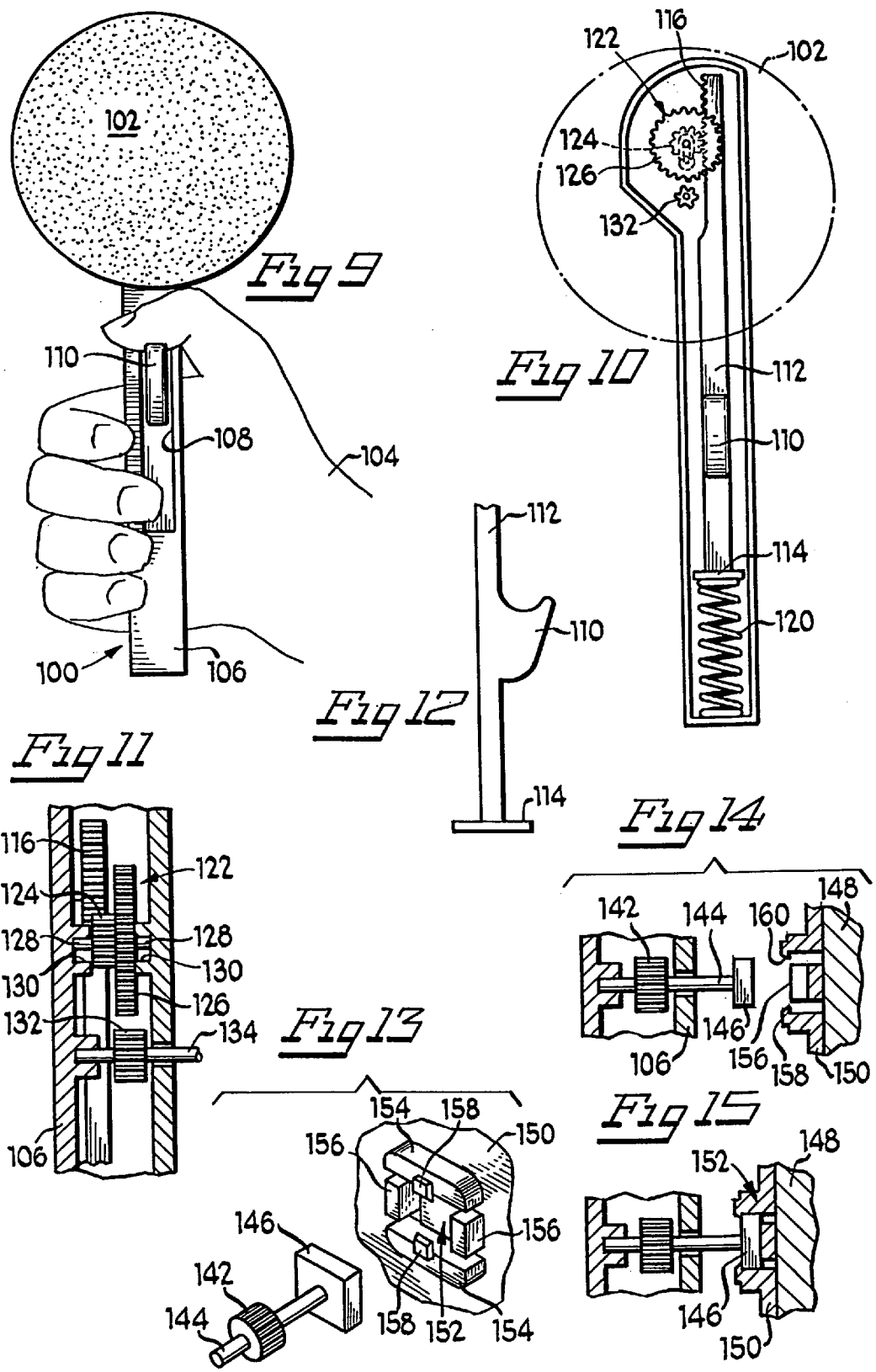

5,957,746

DEVICE FOR HOLDING AND ROTATING CANDY

BACKGROUND OF THE INVENTION

1. Field of the Invention

This invention relates generally to novelty devices that can be used to hold and rotate candy and more particularly to a manually operable device for holding and rotating candy in one direction with one hand of the user.

2. Background Art

Suckers or lollipops, either in the form of a sphere or a disk mounted on a stick, have long been popular candies. Eating a sucker most often involves licking it and, particularly with the spherical suckers, turning or rotating it as it is being licked. There are prior art devices facilitating the mechanical rotation of the spherical suckers. One such device is disclosed in Schwartz U.S. Pat. No. 2,799,587 and Schwartz et al. U.S. Pat. No. 3,290,157 in which a sucker is secured on one end of a spirally grooved stick with a collar rotatably mounted on the other end of the stick. A nut that engages the spiral grooves is carried by the stick intermediate the sucker and the collar. The user grasps the collar with the fingers of one hand and uses the fingers of the other hand to urge the nut up and down along the stick causing the stick to rotate within the collar and of course, causing the sucker to rotate. The Schwartz device, however, has the distinct disadvantage of requiring the user, who is often a child, to have to use both hands in order to effect rotation of the sucker. A more recent device for rotating a sucker is disclosed in Coleman et al. U.S. Pat. No. 5,209,692 and uses an electric motor to effect rotation of the sucker. Products sold under the registered trademark "SPIN POP" owned by Cap Toys, Inc. on which U.S. Pat. No. 5,209,692 is marked, are somewhat different in appearance than the device disclosed in Coleman et al. with the battery motor and drive mechanism being carried within a generally cylindrical handle portion rather than the housing disclosed in the Coleman et al. patent. Although the battery powered electric motor device permits the user to hold and rotate the sucker with only one hand, it does have disadvantages resulting from the use of the battery powered electric motor such as weight, cost and possible perceived concerns about the use by a child of an electric motor powered device driving something that a child will insert in its mouth. In addition, neither the Schwartz nor the Coleman device provides for the rotation of a disc shaped sucker, as opposed to a spherical shaped sucker, in a plane generally parallel to the axis of the hand held portion. Accordingly, there continues to be a need for a manually operable device for holding and rotating candy with one hand of the user.

SUMMARY OF THE INVENTION

The present invention is concerned with providing a manually operable novelty device for holding and effecting the mechanical rotation of a sucker with one hand of the user. The device includes a handle portion conveniently formed to be held by a user's hand. A moveable trigger is carried by the handle portion and adapted to be moved by the user's manipulation of the same hand that is holding the handle portion. The trigger is biased against movement by the manipulation of the user's hand. A shaft having opposing ends is carried by and extends from the handle portion. A sucker or lollipop is connected to one end of the shaft for rotation with the shaft. Gears contained within the handle portion convert the movement of the trigger into rotational movement of the shaft.

The trigger has opposed ends and there is a rack adjacent one of the opposed ends of the trigger. The gears contained within the handle portion include a gear engaged by the rack that is mounted for both rotational movement and reciprocating movement generally parallel to the length of the rack.

The trigger may be mounted for pivotal movement adjacent one end of the trigger and is biased against movement by manipulation of the user's hand intermediate the opposed ends of the trigger. Alternately, the trigger may be carried by a piston having opposed ends the piston being biased against movement by manipulation of the user's hand at one of the opposed ends and the rack is carried by the piston adjacent the other opposed end.

The piece of candy may be carried by a dish. On the side of the dish opposite the candy is a mechanism for attaching the dish to the rotating shaft, outside of the handle, for rotation with the shaft.

BRIEF DESCRIPTION OF THE DRAWINGS

For better understanding of the present invention, reference may be had to the accompanying drawings in which:

FIG. 1 is an elevational view of an embodiment of the present invention;

FIG. 2 is an enlarged scale, vertical sectional view of the embodiment shown in FIG. 1, in an actuated state;

FIG. 3 is a view similar to that in FIG. 2, but showing the embodiment in a released state;

FIG. 4 is a sectional view taken generally along line 4—4 of FIG. 3;

FIG. 5 is a front elevational view;

FIG. 6 is a vertical sectional view of another embodiment of the present invention;

FIG. 7 is a vertical sectional view taken generally along line 7—7 of FIG. 6;

FIG. 8 is a sectional view taken generally along line 8—8 of FIG. 6;

FIG. 9 is an elevational view of yet another embodiment;

FIG. 10 is a vertical sectional view of the embodiment shown in FIG. 9;

FIG. 11 is an enlarged fragmentary view of a gear mechanism for the embodiment shown in FIG. 9;

FIG. 12 is a fragmentary side elevational view of the trigger of the embodiment shown in FIG. 9;

FIG. 13 is an enlarged scale, exploded perspective view of a sucker carrying dish attachable to the rotating shaft outside of the handle;

FIG. 14 is a generally vertical sectional view of the attachment mechanism; and

FIG. 15 is another generally vertical sectional view but showing the components attached.

DETAILED DESCRIPTION

Referring now to the drawings, in which like parts are designated by like reference numerals throughout the several views, there is shown in FIG. 1 a manually operable device 20 for holding and rotating a candy sucker or lollipop 22 in the form of a disc to be rotated in the direction of arrow 23 when the device is held and squeezed by one hand 24 of the user. Device 20 includes a handle portion 26 adjacent the bottom of which is a circular area 27 which may be raised or depressed, to facilitate application of a decoration or logotype by embossment, stamping or decal application. A moveable trigger 28 is carried by the handle for squeezing by the same hand that holds the handle. Thus, a relatively compact handle and trigger combination is readily held and operated by a single hand of the user without any transversely protruding parts.

Disc sucker 22 may be formed, in conventional ways, of a single solid color or with a pattern of differently colored candy portions. Thus, as illustrated in FIG. 1, sucker 22 is formed with concentric circles of alternating colors. Such a pattern may be offset from center or another pattern such as spirals may be employed to enhance the rotation of the disc shaped sucker in the direction of arrow 23.

As is shown in greater detail in FIGS. 2, 3, 4 and 5, trigger 28, which has opposed ends, is mounted adjacent one of the opposed ends for pivotal movement into and out of handle portion 26 about pivot pin 30. A coil spring 32 is used to bias trigger 28 outwardly of device 20. It will be apparent to those skilled in the art that other biasing devices, such as for example, a leaf spring, may be employed to exert the biasing force necessary to urge trigger 28 out of device 20. As illustrated in FIGS. 2 and 3, trigger 28 is generally in the shape of the mirror image of the numeral "7". A somewhat arcuate rack 34 is integrally formed adjacent the other opposed end, along the upper edge of trigger 28. Rack 34 is in engagement with a pinion 36 of a combination gear 38 that also includes a spur gear 40.

Combination gear 38 is formed with an integral shaft 42 that extends on either side of pinion 36 and spur gear 40. Each end of shaft 42 is received for both rotational movement and limited reciprocating movement within an elongated slot 44. The reciprocating movement of shaft 42 is generally parallel to the length of rack 34. Thus, when trigger 28 is squeezed against the bias of spring 32, rack 34 drives pinion 36 and spur gear 40 in a counter-clockwise rotation, as illustrated by arrow 45 in FIG. 2, and at the same time drives combination gear 38 from the left hand most position as illustrated in FIG. 3 to the right hand most position as illustrated in FIG. 2 of slot 44. The linear movement of combination gear 40 to the right hand limit of the elongated slots 44 brings spur gear 40 into driving engagement with pinion 46, which is journaled for rotation with shaft 48, to cause pinion 46 to rotate in a clockwise direction, as illustrated by arrow 49 in FIG. 2.

When the fingers of hand 24 release trigger 28, it is moved outwardly by the biasing force of spring 32. Rack 34, remaining in engagement with pinion 36, moves combination gear 38 back toward the left hand most limit of elongated slots 44 and hence moves spur gear 40 out of engagement with pinion gear 46, permitting pinion gear 46 and shaft 48 to freely continue to rotate in the clockwise direction of arrow 49. Sucker 22, as is best shown is FIGS. 4 and 5, is mounted for rotation with shaft 48. Repeated squeezing and release of trigger 28 with the fingers of hand 24 will, in turn, effect repeated driving of pinion 46 by the rotation of spur gear 40 and alternately permit free wheeling rotation of pinion 46, shaft 48 and the disc shaped sucker 22 building up a momentum of rotation of sucker 22 in the clockwise direction.

There is shown in FIGS. 6, 7 and 8 an alternate embodiment, namely, device 50 that is manually operable for holding and rotating a spherical candy sucker or lollipop 52 with one hand of the user. As shown in FIG. 6, device 50 appears generally similar to device 20 as viewed in FIGS. 1 and 2, except that the hand 24 has been omitted. In addition, spherical sucker 52, which is mounted for rotation generally about the axis of vertically extending shaft 54, has been substituted for the disc shaped sucker 22. Indeed, a handle 56 has a lower portion with a flat, circular portion 57, similar to portion 27 of device 20. However, when viewed from the front or back as in FIG. 7, it is apparent that device 50 has a wider or thicker upper portion 58.

A trigger 60 is mounted for pivotal movement and is biased outwardly of handle 56 in a manner similar to that shown and described with respect to device 20. Thus, trigger 60 is mounted adjacent the lower end of handle 56 for pivotal movement about pivot pin 62 against the bias of spring 64. Trigger 60 is moved inwardly by the squeezing action of the fingers of the one hand that is holding device 50, again as with device 20. A somewhat arcuate rack 66 is integrally formed adjacent the upper end of trigger 60. However, unlike rack 34, the teeth of which face generally upwardly in the orientation of the device 20 illustrated in FIGS. 1–5, the teeth of rack 66 face laterally inwardly towards the center of the device and are carried by a portion 68 of the trigger that is narrower than the rest of the width of trigger 60 and extends along only one side of trigger 60, as is perhaps best illustrated in FIGS. 7 and 8. A portion 70 of trigger 60 is cutaway to facilitate inward movement of the trigger.

Rack 66 is in engagement with a pinion 72 of a combination gear 74 that also includes a spur gear 76. Within upper portion 58 are generally parallel spaced apart, upper and lower ledges 78 and 80, respectively. Combination gear 74 is formed with an integral shaft 82 that extends on either side of pinion 72 and spur gear 76. Each end of shaft 82 is received for both rotational and limited reciprocating movement within an elongated slot 84. Thus, when trigger 60 is squeezed against the bias of spring 64, rack 66 drives pinion 72 and spur gear 76 in a counter-clockwise rotation and at the same time, drives combination gear 74 from the left hand most position as illustrated in FIG. 6 to a right hand most position of slots 84. An opening 86 is provided in lower ledge 80 to accommodate the inward movement of the upper portion of trigger 60.

Shaft 54 is journaled at one end in lower ledge 80 for rotation about a generally vertical axis in the orientation of device 50 as illustrated in FIGS. 6, 7 and 8. Adjacent the journaled end, but spaced from ledge 80, shaft 54 is provided with a pinion 90. Shaft 54 then extends through opening 92 in upper ledge 78 and opening 94 in upper portion 58. Similar to the operation of the embodiment shown in FIGS. 1–5, the linear movement of combination gear 74 to the right hand limit of elongated slots 84 brings spur gear 76 into driving engagement with pinion 90 to cause pinion 90 to rotate in a clockwise direction. However, because the gear mechanism of this embodiment is generally horizontally disposed in the orientation shown in FIGS. 6–8 as opposed to the generally vertical orientation of the gear mechanism in the embodiment shown in FIGS. 1–5, sucker 52 will be rotated about the generally vertical axis of shaft 54 rather than being rotated about a generally horizontal axis, as is sucker 22.

The change in the orientation of the axis of rotation of the sucker between the two embodiments could be achieved in other ways besides reorienting the gear mechanism approximately ninety degrees. For example, a set of gears could be used that includes a pair of bevel gears. Thus, a combination gear with a pinion gear and a bevel gear, instead of the spur gear, would engage a bevel gear on the sucker shaft, rather than the pinion. The gear mechanism could also be modified to use a set of spiral gears in place of the spur gear of the combination gear and the pinion on the sucker shaft.

Yet another embodiment of the present invention is shown in FIGS. 9–12. Device 100 is again manually operable for holding and rotating a sucker or lollipop 102 with one hand 104 of the user. However, unlike the embodiments illustrated in FIGS. 1–8, which are operated by a squeezing action of the fingers of the hand, device 100 is operated by the downward motion of the thumb of hand 104. Device 100 has a generally hollow, cylindrical handle 106 in which there is an elongated opening 108 which permits access to a trigger 110.

As is best shown in FIGS. 10 and 12, trigger 110 is integrally formed as part of a piston 112 having opposed upper and lower ends. At the lower end, piston 112 has an enlarged head 114. Adjacent the upper end of piston 112 is a rack 116. A coil spring 120 is carried within hollow handle 106 between the bottom of the handle and head 114 of piston 112. Thus, spring 120 urges piston 112, trigger 110 and rack 116 upwardly.

A combination gear 122 is formed with a pinion 124 and a spur gear 126. Extending on either side of pinion 124 and spur gear 126 is a shaft 128. An elongated slot 130 formed on the inside of hollow handle 106 receives shaft 128 for both rotational movement and limited reciprocating movement. When piston 112 is urged downwardly by the force of the user's thumb, rack 116 engages pinion 124 to rotate combination gear 122 in a clockwise direction, as viewed in FIG. 10, while at the same time moving the combination gear downwardly to the lower limit of slots 130. A pinion 132 is mounted for rotation with a shaft 134 that is journaled for rotation at one end inside of handle 106 and extends outwardly on the other side of pinion 132 through an opening in handle 106. Pinion 132 is spaced from combination gear 122 such that when the combination gear is moved downwardly to the lower limit of slots 130, spur gear 126 engages pinion 132 rotating pinion 132 in a counter-clockwise direction causing shaft 134 and sucker 102, which is attached to shaft 134 to rotate in a counter-clockwise direction.

All three of the embodiments shown and described, may be modified to provide for a removable connection between the shaft carrying the sucker and the pinion driving the shaft. Thus, for example, the pinion could be provided with a keyed axial opening and the end of the shaft opposite the sucker could be formed to fit into the keyed opening so that the keyed shaft is driven by the rotation of the pinion.

In yet another version or modification, the pinion 46 and shaft 48 of the embodiment shown in FIGS. 1–5 or the pinion 132 and shaft 134 of the embodiment shown in FIGS. 9–12 could be made as illustrated in FIGS. 13–15 in which pinion 142 is secured to shaft 144 for rotation with the shaft. At the end of shaft 144 that extends outside of the handle is a square key 146 secured to shaft 144 for rotation with the shaft. It will be appreciated by those skilled in the art that key 146 is not particularly limited to a square shape but can be of any geometric shape that readily transmits rotation when coupled with a mating/receiving socket.

Sucker 22 of the embodiment shown in FIGS. 1–5 and sucker 102 of the embodiment shown in FIGS. 9–12 may be formed as a sucker 148 on one side of a plastic backing dish 150, a fragment of which is shown in FIGS. 13–15. Dish 150 may be provided with a peripheral rim (not shown), particularly if the sucker is formed by molding. Such a peripheral rim may also be used where the sucker is made by first rolling and stretching the candy into a rope and then coiling the rope in a spiral to form a flat disc like sucker. The inherent stickiness of the candy will cause the sucker to adhere to the dish. Whatever conventional method of making the sucker is used, dish 150, with or without a peripheral rim, helps protect against breakage of the sucker, particularly during shipment. Attractive and amusing decorations may be facilitated by placing graphics, such as on a sticker on the back of the dish. Such a sticker can have a design of concentric circles and/or alternating colors. Indeed, such a sticker may continue to provide amusement and play value even after the sucker has been consumed.

Dish 50 is provided, on the side opposite sucker 148 with a receiving socket 152 for square key 146. Socket 152 is formed of a first pair of spaced apart generally parallel walls 154 and a second part of generally parallel spaced apart walls 156 which, in combination, define a square opening that conforms to the outer size and shape of square key 146. Walls 154 and 156 are made of a plastic material which has some inherent resiliency. As is best shown in FIGS. 14 and 15, walls 154 each include a generally centrally disposed inwardly projecting tab 158 that has a downwardly and inwardly extending angle face 160 leading into the center of the space defined by walls 154 and 156. The depth of the square recess defined by walls 154 and 156 is slightly more than the height of square key 146. In attaching dish 150 to shaft 144, or more particularly square key 146, the square key is forced into socket 152 to outwardly deflect tabs 158. The inherent resiliency of tabs 158 then return the tabs to their initial position retaining dish 150 attached to shaft 144 in a manner that will permit driven rotation of dish 150 and the sucker that it carries. After the sucker is consumed, it is possible, with some force, to remove dish 150 from square key 146 and replace the dish with another that has an unconsumed sucker.

While several embodiments of the present invention have been shown and described, with some alternatives, it will be apparent that further changes and modifications will occur to those skilled in the art. It is intended in the appended claims to cover all such changes and modifications as fall within the true spirit and scope of the present invention.

What is claimed as new and desired to be secured by Letters Patent is:

1. A manually powered device for holding and rotating candy, comprising in combination:

a handle portion conveniently formed to be held by a user's hand;

a moveable trigger carried by the handle portion and adapted to be moved by the user's manipulation of the same hand that is holding the handle portion;

means biasing the trigger against movement by the manipulation of the user's hand;

a shaft carried by and extending from the handle portion, the shaft having opposed ends;

a piece of candy;

the piece of candy being connected to one end of the shaft for rotation with the shaft;

means contained within the handle portion for converting the movement of the trigger into rotational movement of the shaft;

the means contained within the handle portion for converting the movement of the trigger into rotational movement of the shaft including a length of gear teeth that moves in response to movement of the trigger; and the means contained within the handle portion for converting the movement of the trigger into rotational movement of the shaft further including a gear that engages the length of gear teeth, the gear being mounted both for rotational movement and for reciprocating movement generally parallel to the direction of the movement of the length of gear teeth.

2. The device of claim 1 in which the trigger is mounted for pivotal movement adjacent the other opposed end of the trigger.

3. The device of claim 2 in which the trigger is biased against movement by manipulation of the user's hand intermediate the opposed ends of the trigger.

4. The device of claim 1 in which the trigger is biased against movement by manipulation of the user's hand.

5. The device of claim 1 further comprising in combination:

the piece of candy being formed in the shape of a disc;

a dish carrying the piece of candy; and means for connecting the dish to the one end of the shaft outside of the handle portion for rotation of the dish with the shaft.

6. The device of claim 5 in which decorative graphics are applied to the dish.

7. The device of claim 5 in which the means for connecting the one end of the shaft for rotation with the dish comprises a key on the one end of the shaft and a mating socket on the dish.

8. The device of claim 7 in which:

the dish has two sides;

the piece of candy is carried on one side; and the socket is on the other side.

9. The device of claim 7 in which the socket is defined by a plurality of walls formed of an inherently resilient material.

10. The device of claim 9 in which at least one of the plurality of walls includes a tab projecting inwardly toward the socket.

11. The device of claim 10 in which the projecting tab has an angled face leading into the socket.

12. A manually powered device for holding and rotating candy, comprising in combination:

a handle portion conveniently formed to be held by a user's hand;

a moveable trigger carried by the handle portion and adapted to be moved by the user's manipulation of the same hand that is holding the handle portion;

means biasing the trigger against movement by the manipulation of the user's hand;

a shaft carried by and extending from the handle portion, the shaft having opposed ends;

a piece of candy;

the piece of candy being connected to one end of the shaft for rotation with the shaft;

means contained within the handle portion for converting the movement of the trigger into rotational movement of the shaft;

the trigger having opposed ends;

a rack adjacent one of the opposed ends of the trigger; and the means for converting the movement of the trigger into rotational movement of the shaft including a gear engaged by the rack that is mounted for both rotational movement and reciprocating movement generally parallel to the length of the rack.

13. A manually powered device for holding and rotating candy, comprising in combination:

a handle portion conveniently formed to be held by a user's hand;

a moveable trigger carried by the handle portion and adapted to be moved by the user's manipulation of the same hand that is holding the handle portion;

means biasing the trigger against movement by the manipulation of the user's hand;

a shaft carried by and extending from the handle portion, the shaft having opposed ends;

a piece of candy;

the piece of candy being connected to one end of the shaft for rotation with the shaft;

means contained within the handle portion for converting the movement of the trigger into rotational movement of the shaft:

the means for converting the movement of the trigger into rotational movement of the shaft including a rack carried by the trigger; and the means for converting the movement of the trigger into rotational movement of the shaft including a gear engaged by the rack that is mounted for both rotational movement and reciprocating movement generally parallel to the length of the rack.

14. A manually powered device for holding and rotating candy, comprising in combination:

a handle portion conveniently formed to be held by a user's hand;

a moveable trigger carried by the handle portion and adapted to be moved by the user's manipulation of the same hand that is holding the handle portion;

means biasing the trigger against movement by the manipulation of the user's hand;

a shaft carried by and extending from the handle portion, the shaft having opposed ends;

a piece of candy;

the piece of candy being connected to one end of the shaft for rotation with the shaft;

means contained within the handle portion for converting the movement of the trigger into rotational movement of the shaft;

the trigger being carried by a piston having opposed ends;

the piston being biased against movement by manipulation of the user's hand at one of the opposed ends;

the rack being carried by the piston adjacent the other opposed end; and the means for converting the movement of the trigger into rotational movement of the shaft including a gear engaged by the rack that is mounted for both rotational movement and reciprocating movement generally parallel to the length of the rack.

* * * * *

UNITED STATES PATENT AND TRADEMARK OFFICE
CERTIFICATE OF CORRECTION

PATENT NO : 5,957,746
DATED : September 28, 1999
INVENTOR(S) : Sidney Diamond

It is certified that error appears in the above-identified patent and that said Letters Patent are hereby corrected as shown below:

Column 3, Line 38          After "combination gear", delete "40" and insert --38--

Column 3, Line 52          Delete "Figs 4 and 5" and insert --Fig. 5--

Column 6, Line 8           After "dish", delete "50 and insert --150--

Signed and Sealed this

Seventeenth Day of April, 2001

Attest:

NICHOLAS P. GODICI

Attesting Officer    Acting Director of the United States Patent and Trademark Office